INVENTOR
W. J. LAWLESS
BY
Charles Scott Phelan
ATTORNEY

United States Patent Office 3,479,524

Patented Nov. 18, 1969

3,479,524

MULTIPLE COUNTER STAGE USING COINCIDENCE GATES TO COORDINATE INPUT SIGNALS AND FEEDBACK SIGNALS WITHIN THE STAGE

William J. Lawless, Middletown, N.J., assignor to Bell Telephone Laboratories, Incorporated, Murray Hill, N.J., a corporation of New York Filed June 29, 1966, Ser. No. 561,632
Int. Cl. H03k 23/22, 19/24
U.S. Cl. 307—222 16 Claims

ABSTRACT OF THE DISCLOSURE

A multistable counter stage is formed by a set of coincidence gates supplying input signals to a pair of two-stage common emitter amplifiers in coordination wi.h output feedback from each amplifier to inputs of both amplifiers. Control signals are also applied through the gates for electrically changing the counting direction for the stage. Coincidence gates in the form of multiple-emitter transistors are shown for integrated circuit applications.

This invention relates to electric circuits for counters; and more particularly, it relates to such counters in which the stability state and mode of counter stage operation are established by an integral circuit unit.

The invention is described as applied to reversible counters. Reversible counters are finding increasingly broad applications. For example, such counters are employed in the digital demodulator of the R. O. Soffel Patent 3,230,457. Such counters are also employed in various aspects of data transmission systems such as the multilevel system described in the copending application Serial No. 459,659, filed May 28, 1965, of F. K. Becker, now Patent No. 3,401,342, issued September 10, 1968 and entitled "Suppressed Carrier Transmission System for Multilevel Amplitude Modulated Data Signals." As such uses expand, it becomes increasingly desirable that reversible counters should be convenient to manufacture and efficient to operate. It is also desirable that such counters in their manufactured form should occupy a minimum of space in the apparatus in which they are employed.

Generally reversible binary counters have employed an array of bistable circuits with plural input connections and plural output connections for each such circuit. External gating is provided for steering counting signals to appropriate inputs of the bistable circuit to secure operation in a desired counting direction. These bistable circuits, and often the steering gates utilized therewith, usually depend heavily upon alternating current capacitive coupling within individual circuits and among such circuits.

Integrated circuit technology provides one avenue for substantially reducing the size and, in many cases, increasing the efficiency of circuits that are presently known in a discrete-element form. Reversible electronic counters comprise one group of such circuits. However, the prior art reversible counter forms are inconvenient for manufacturing in an integrated circuit form. For example, the capacitors employed in such prior art reversible counting arrangements are often difficult to implement in the integrated circuit form because of a number of known factors for different types of intgrated circuit capacitors. Some such factors are limited maximum capacitance, large parasitics, capacitive modulation effects, and requirements for extra manufacturing process stages.

It is, therefore, one object of the present invention to improve counting circuits.

An additional object is to improve reversible counters.

Another object is to adapt reversible counters to the convenient use of integrated circuit technology.

A further object is to device a unified counter stage stability control and counter direction mode control.

Still another object is to eliminate the need for capacitive elements in reversible counters.

These and other objects of the invention are realized in an illustrative embodiment in which each stage of a reversible counter includes a pair of translating circuits arranged for multistable operation in different counting direction modes in response to input counting signals and direction control signals. A plurality of coincidence gates in each stage control individual feedback circuits for the translation circuits and also control cross-coupling feedback circuits between the translating circuits of a stage to produce the multistable operation thereof. The coincidence gates are operated in accordance with predetermined permutations of the input counting signals, the direction control signals, and the output signals of the translating circuits.

It is one feature of the invention that all of the circuits wi:hin each counter stage, as well as the interstage coupling circuits, are of a direct-current coupled type so that no alternating current capacitive coupling is required.

It is another feature that the coincidence gates are of the diode resistor logic type.

Still another feature is that the counter stage coincidence gates are advantageously implemented in the form of a multiple-emitter transistor element for each gate in one embodiment of the invention, thereby facilitating the integrated circuit manufacturing processes, reducing the number of circuit connections required, and minimizing the physical steps required for manufacturing the completed counter stage.

A complete understanding of the invention and its various features and objects may be obtained from a consideration of the following detailed description and the appended claims in connection with the attached drawing in which:

Figures 1, 2A, 2B:
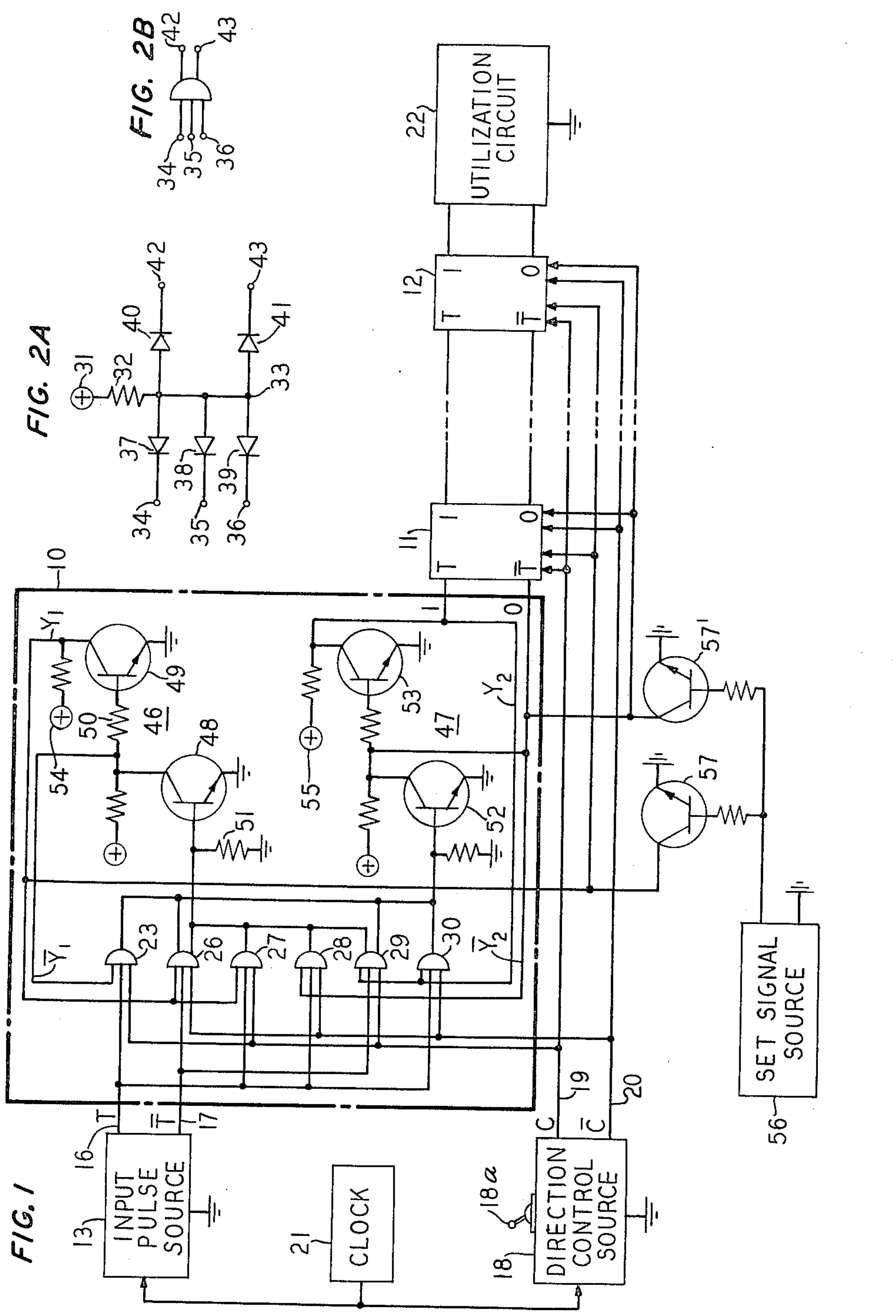
FIG. 1 is an electric circuit diagram of one embodiment of a counter in accordance with the invention.
FIGS. 2A and 2B illustrate one form of logic circuit employed in FIG. 1.
Figure 3:
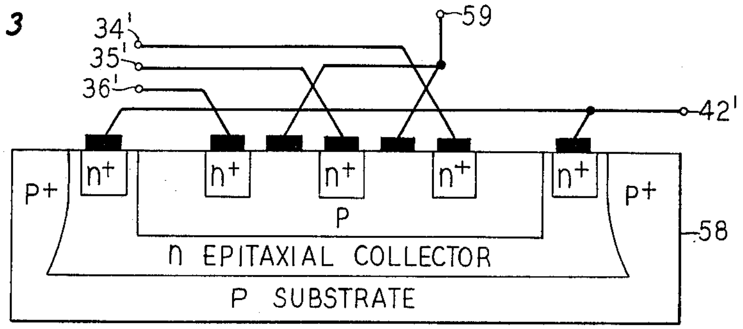
Figure 4A:
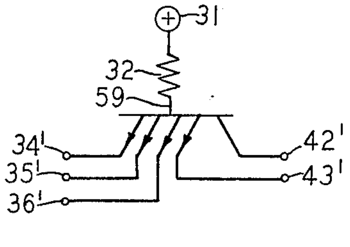
Figure 4B:
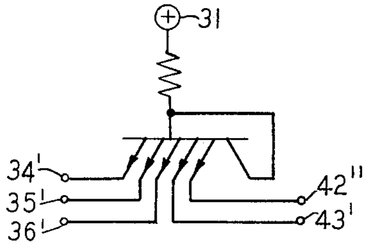
Figure 5A:
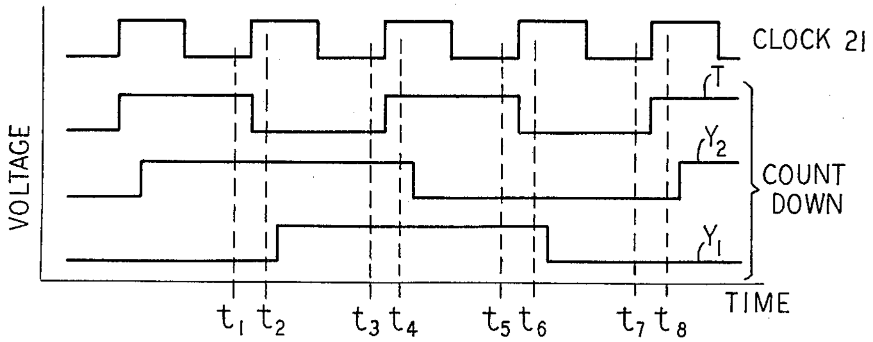
Figure 5B:
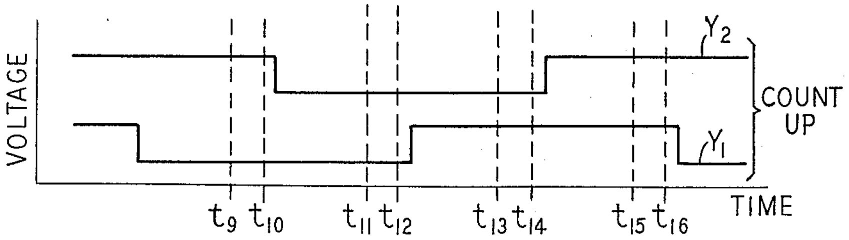

FIGS. 3, 4A, and 4B illustrate modified forms of logic circuit employed in FIG. 1; and FIGS. 5A and 5B are voltage wave diagrams illustrating the operation of the invention.

In FIG. 1 the reversible counter of the invention is shown in an application for a binary counter and includes counter stages 10, 11, and 12, which are all alike. Accordingly, only the stage 10 is shown in detail. More stages may be included in the counter as desired for any particular application and as indicated by the dotted circuit connections between stages 11 and 12. An input pulse source 13 supplies signals to be counted, and these signals are provided with respect to ground in a double rail logic form on output connections 16 and 17. The two complementary forms of these input pulse signals are designated T and $\overline{T}$, and signal wave T is shown in FIG. 5A. The source 18 supplies direction control signals to each stage of the counter on the source output circuits 19 and 20. The two complementary forms of the direction control signals are designated C and $\overline{C}$ and have substantially constant levels during any given directional mode of operation.

The input signals to the counter from source 13 and source 18 are two-state signals and are supplied with state changes in a predetermined phase relationship so that they do not change state simultaneously. This relationship between the sources 13 and 18 is fixed by the output of a clock 21 providing a wave as shown, for example, in FIG. 5A. Clock 21 represents, in a practical application of the circuit, a central control. In such a case, the output of source 13 changes state on only positive-going clock wave transitions as shown in FIG. 5A. The source 18 is advantageously adapted to change state on only negative-going clock signal transitions, and source 18 includes a toggle switch 18*a* whereby an operator orders change in direction. On the next negative-going clock transition following operation of switch 18*a* the state of source 18 output signals is changed. In some applications it is advantageous to use a conventional single-rail-to-double rail inverting circuit to get the complementary outputs for sources 13 and 18, respectively, to be certain that in each case the complementary forms change state at substantially the same time. However, details of sources 13 and 18, and clock 21, and for providing their described relationships, are known in the art and comprise no part of the present invention.

A utilization circuit 22 of any suitable type is coupled to the output connections of counter stage 12. It is to be understood, however, that multiple output signals may be advantageously derived in parallel from each of the stages as convenience may dictate for a particular circuit application.

Counter stage 10 includes six coincidence gates 23, 26, 27, 28, 29, and 30, each of which has three input connections and at least one output connection. A schematic diagram of a diode-resistor logic form of such a gate is shown in FIG. 2A, and the coresponding schematic representation thereof is shown in FIG. 2B. This type of gate is advantageously employed because it includes no capacitors. Each such gate includes a potential source 31 which is schematically represented by a circled polarity sign indicating the polarity of the source terminal which is connected to the circuit point at which the circle is located. The opposite polarity terminal of the source is connected to ground. Each gate also includes a resistor 32 connecting the source 31 to a common circuit junction such as the terminal 33. Input signals are coupled through input terminals 34, 35, and 36, and through similarly poled diodes 37, 38, and 39, to the terminal 33 for controlling the operation of the gate in a well known manner. Thus, in the form illustrated in FIG. 2A, the coincidence of positive signals at the aforementioned input connections biases all of the diodes 37, 38, and 39 to a nonconducting condition and thereby permits current to flow from source 31 through resistor 32 and diodes 40 and 41 to gate output terminals 42 and 43. However, the presence of at least one ground connection at an input terminal of the gate permits current to flow from source 31 through the corresponding input diode and thereby clamp the output diodes 40 and 41 in a nonconducting condition so that the output terminals 42 and 43 are caused to float. Either of the outputs 42 and 43 can, of course, be omitted for a particular circuit application.

The coincidence gates for counter state 10 receive input pulses from source 13 and direction control signals from source 18 by direct-current coupling circuits. Thus, the T output of source 13 is coupled to gates 23, 27, 28, and 30. The $\overline{T}$ output is coupled to gates 26 and 29. Similarly the C output of source 18 is applied to the three gates 23, 27, and 29, while the $\overline{C}$ output is applied to gates 26, 28, and 30. All of the aforementioned coincidence gates respond to the signals from sources 13 and 18 for controlling feedback and cross-coupling within their multistable counter stage 10.

Two electrical translating circuits 46 and 47 are included in the counter stage 10 and are all essentially the same configuration. The circuit 46 includes transistors 48 and 49 connected in common emitter amplification stages that are coupled for tandem operation with the output from the amplifier that includes transistor 48 driving the amplifier of transistor 49. The two amplifiers are direct-current coupled in their tandem arrangement by means of a resistor 50 which is connected between the collector electrode of transistor 48 and the base electrode of transistor 49. A resistor 51 is connected between ground and the base electrode of transistor 48 to speed up transistor turn-off time in a manner which is known in the art. Transistor 48 is biased in its common emitter amplifier stage to be either in a nonconducting cut-off state or in a conducting state in which it operates at a saturated conduction level. These two states are produced in response to the low level and the high level, respectively, of output signals that are direct-current coupled to the input connection at the base electrode of transistor 48 from the counter stage coincidence gates. The amplifier circuit of transistor 49 is therefore caused to be conducting or nonconducting at times when the transistor 48 is nonconducting or conducting, respectively.

The translation circuit 47 is similar to the circuit 46 and includes two transistors 52 and 53 interconnected for the same type of operation in response to direct-current coupled output signals from the counter stage coincidence gates. Collector potential sources 54 and 55 are provided for transistors 49 and 53, but generally only transistor 53 needs such a source because its circuit must furnish current outside of the stage. Source 54 can be eliminated; and, if it is, transistor 49 takes current from source 31 of gate 26 or gate 27 when saturated conduction is required by the signal on the base electrode of transistor 49.

Each of the translation circuits 46 and 47 has two output connections for providing complementary output signals at its two transistor collector electrodes. Thus, in the translation circuit 46 an output from the collector electrode of transistor 49 is designated $Y_1$ and is direct-current coupled to inputs of gates 26 and 27 for supplying feedback at selected times to its own input connection and to the input connection of translation circuit 47. Translation circuit 46 has an additional output connection designated $\overline{Y}_1$ which is direct-current coupled from the collector electrode of transistor 48 to an input of the gate 23 for providing cross-coupling feedback at selected times to the input of translation circuit 47. Similarly, the translation circuit 47 has direct-current coupled feedback paths. One of these, designated $Y_2$, is from the collector electrode of transistor 53 and provides feedback at selected times through gates 29 and 30 to input connections of both translation circuits. The translation circuit 47 also has a second feedback connection $\overline{Y}_2$ from the collector electrode of transistor 52 through the gate 28 to the input of translation circuit 46. Output signals for counter stage 10 are derived at the collector electrodes of transistors 52 and 53 for the binary ZERO and ONE output signals, respectively. These output signals comprise the $\overline{T}$ and T counting input signals to the following counter stage 11.

From an external standpoint the counter stage 10 responds to two-state input signals and two-state direction control signals to produce binary ONE and ZERO outputs of typical binary counting form, i.e., the output signal frequency of each stage is one-half of the input signal frequency of the stage. However, within the stage the operation of the two translation circuits under the control of the counter stage coincidence gates provides multiple stability conditions as a function of different predetermined permutations of input source signals, direction control source signals, and output signals from the translation circuits. The output signal appearances illustrated in FIGS. 5A and 5B are in the form that is typical for the output of a binary counter. Such circuit 10 outputs are derived from complementary circuit points in the single translation circuit 47, but only the second-stage outputs are shown in FIGS. 5A and 5B. The reversible type of operation for a single stage, such as circuit 10, of the counter is conveniently expressed in Boolean algebra form as follows:

$$Y_1 = Y_1\overline{T}\,\overline{C} + Y_2\overline{T}C + Y_1TC + \overline{Y}_2T\overline{C}$$
$$Y_2 = Y_1\overline{T}\,\overline{C} + Y_2\overline{T}C + \overline{Y}_1TC + Y_2T\overline{C}$$

In these equations a character without an overbar indicates a positive signal for the illustrated embodiment, and an overbar on a character indicates a complement. In the absence of all of the conditions on the right-hand side of an equation, the signal indicated on the left-hand side is at its low level.

It can be seen from FIG. 5A that each transition in the wave T causes one of the translation circuits 46 and 47 to change its conducting condition. Only one form of each signal is illustrated, but the complementary forms are also produced by the circuit of FIG. 1. There is a significant time lag between each transition for input signal T and the corresponding translation circuit response. This delay is caused by necessary delay in the translation circuit response which is inherent in semiconductor devices but which is shown out of proportion in FIG. 5A to indicate its presence clearly. The delay must be at least as large as the drive signal T transition time so that there are no false transitions in the stage output signals during an input signal transition.

FIG. 5A further shows that for down counting, i.e., control signal C high and $\overline{C}$ low, each positive-going transition of T, e.g., just after times $t_3$ and $t_7$, causes translating circuit 47 to change state, e.g., after times $t_4$ and $t_8$. Each negative-going transition, e.g., after times $t_1$ and $t_5$, causes translating circuit 46 to change state, e.g., after times $t_2$ and $t_6$. The corresponding changes at the ONE output of stage 10 are applied to the T input of stage 11 to actuate the translating circuit 47 thereof, and so forth through the counter chain for operation in the down counting mode. For example, if all stages rest in the ZERO state a single input signal transition resets the counter to the ONE state. In the down counting mode, stage 10 uses outputs from gates 23, 27, and 29 and operates as a positive-toggle binary counter.

Operation of toggle switch 18*a* in FIG. 1 forces C low and $\overline{C}$ high to initiate the up counting mode. FIG. 5B illustrates this mode with reference to the same T wave in FIG. 5A but using different corresponding time notations. Now translating circuit 47 changes state on negative-going transitions of T, e.g., just after times $t_{10}$ and $t_{14}$ as indicated by the ½ diagram. Circuit 46 changes on positive-going transitions, e.g., just after times $t_{12}$ and $t_{16}$. These signal changes in the tandem counting chain of FIG. 1 represent the up counting mode of operation. For example, if all stages rest in the ONE state a single input signal transition resets the counter to the ZERO state. In the up counting mode, stage 10 uses outputs from gates 26, 28, and 30 and operates as a negative-toggle binary counter.

It was previously stated that the counter of the present invention is not disturbed falsely by state changes in the direction control signals. This results from the fact that the transition of the directional control signal from source 18 cannot occur except on negative-going clock signal transitions, and those occur between transitions of the T input signal. Thus, clock 21 is used with sources 13 and 18 to prevent the simultaneous occurrence of a T transition and a C transition.

In the course of a direction mode change of either polarity, the restrains of the aforementioned Boolean equations defining the operation of the coincidence gates of each counter stage cause the correct corresponding forward and reverse coincidence gates to be enabled or disabled so that the states of translating circuits 46 and 47 are not disturbed when the direction mode changes. On the next T signal transition following a direction mode change, the circuit changes state in accordance with the new mode of counter operation. Thereafter operation continues in the appropriate mode as hereinbefore described.

A setting signal source 56 has its output coupled through separate common emitter amplifier stages including two transistors 57 and 57′, respectively, to control the potential levels of the collectors of transistors 49 and 52 in each stage of the reversible counter. With C high and $\overline{C}$ low, the application of such a set signal establishes a predetermined stability state for each counter stage regardless of the previous state thereof, and atfer removal of the set signal the set state prevails until changed by T signals. A setting signal from source 56 causes transistors 57 and 57′ to conduct and places the ZERO output of each counting stage at ground and the ONE output at a positive potential.

FIG. 3 illustrates a cross section of a multiple-emitter transistor device in greatly enlarged form. This device is advantageously employed as a substitute for the diodes of one of the coincidence gates in a stage of the counter in FIG. 1. Transistor 58 is manufactured in accordance with known integrated circuit techniques and has at least three emitter electrode connections 34′, 35′, and 36′ corresponding to the input connections 34, 35, and 36 of the gate in FIG. 2B. Transistor 58 also has a collector connection 42′, corresponding to the gate output connection 42 in FIG. 2B, and a base connection 59 for connection to the resistor 32 in the gate of FIG. 2A. The device of FIG. 3 represents one tiny portion of a monolithic integrated circuit chip advantageously including all semiconductor devices and resistors of one stage of the counter of FIG. 1.

In accordance with known integrated circuit manufacturing techniques it has been found that the device 58 occupies substantially less space on the integrated circuit chip than does an integrated diode-resistor logic form of the gate of FIG. 2A. This difference in physical space occupied results from the fact that the multiple emitters of the transistor 58 require only a single isolation junction.

The transistor 58 is shown in FIG. 3 in one known embodiment wherein it is formed on a substrate of p-type semiconductor material. Transistor 58 has an epitaxial collector region of n-type semiconductor material and collector electrode connection regions heavily doped with n-type impurities. Similar heavily doped n-type emitter regions are diffused in the p-type base region of the transistor. The collector-substrate junction provides isolation of transistor 58 from other circuit elements of the stage on the same chip.

For applications in which a gate must have two output connections, such as the gates 26 and 29 of FIG. 1, the multiple-emitter transistor of FIG. 3 is simply modified during manufacture to include an extra emitter region. A schematic representation of such a multiple-emitter gate with the two output connections 42′ and 43′ is illustrated in FIG. 4.

In the coincidence gate environment for a multiple-emitter transistor the emitter and collector electrode connections on the device all operate with respect to the base electrode connection 59 in substantially the same fashion as the corresponding diode-resistor logic circuit described in connection with FIG. 2A. Independent operation of the various base-emitter junctions is achieved by making the spacing between emitter electrode regions much longer than the circuit path length from an emitter region to a collector region. Thus, application of a positive potential to all of the input emitter electrodes in FIG. 4A permits current to flow from the source 31 through the resistor 32 and through the then forward biased base-collector junction to output terminal 42′ and through the forward biased, output, base-emitter junction to output terminal 43′. However, the application of a ground input signal to any one of the input emitter electrodes permits current to flow therethrough from source 31 so that the output base-emitter junction and the output base-collector junction of the device are necessarily biased to a nonconducting state and conduct no significant output current. Thus, although a transistor format is used for convenience, the device 58 does not employ transistor action in the sense of controlled collector-emitter path conduction.

While transistor 58 is in the form of a transistor, it is operated in the present invention as a diode array without the substantial gain found in transistor operation. This diode mode of operation extends certain advantages for integrated circuit manufacturing. After the usual insulating layer (not shown) is formed over the completed integrated circuit device, conductors from other parts of the same integrated circuit chip can be passed over the device as manufacturing convenience dictates without signals in such crossover circuits disturbing the diode array operation. However, the transistor-resistor-logic form of circuit often employed in the art for coincidence gates is not so conveniently used because the substantial gain in the transistor of such logic makes the device subject to capacitive coupling of interference from a crossover circuit. Accordingly, in crossover situations, a crossover lead must be carried around, and not over, transistors operating as such. Thus, the transistor 58, by its form, permits a space saving and, by its mode of operation, permits increased manufacturing convenience in circuit crossover situations.

Storage time in the base-collector junction of transistor 58 is usually significantly longer than the storage time of base-emitter junctions. Thus, if optimum speed is required, the collector and base junctions are interconnected and a further output base-emitter junction is provided. This form is shown in FIG. 4B with an emitter output connection 42''.

Although the present invention has been described in connection with particular embodiments thereof, it is to be understood that additional modifications and embodiments, which will be obvious to those skilled in the art, are included within the spirit and scope of the invention.

What is claimed is:

1. A binary counter comprising two two-state translation circuits each having an input and having first and second outputs, means receiving input signals for actuating said translation circuits in a counting mode of operation, a plurality of coincidence gates connected for coupling said input signals from said receiving means to said inputs of said translation circuits in accordance with predetermined permutations of said input signals and signals at said outputs of said translation circuits, and means including said gates cross-coupling said first output of one of said translation circuits to said input of the other of said translation circuits, feeding back said second output of said other translation circuit to said inputs of both of said translation circuits, and feeding back said second output of said one translation circuit to its own input.

2. The counter in accordance with claim 1 in which each of said translation circuits comprises two directly coupled tandem amplifier circuits biased for alternative conduction in response to two-level input signals at said input thereof, and such translation circuit input is coupled to an input of a first one of said amplifiers and said outputs of such translation circuit are derived at outputs of said two amplifier circuits, respectively.

3. In a reversible counter, a source of counter direction control signals, first and second electric translation circuits each having an input and first and second outputs, means receiving input signals for actuating said translation circuits in a counting mode of operation, a plurality of coincidence gates connected for coupling said input signals to inputs of said translation circuits in accordance with predetermined permutations of said input signals, said control signals, and signals at said outputs of said translation circuits, means coupling said control signals to said gates, means including said coincidence gates cross-coupling said first output of each of said translation circuits to said input of the other of said translation circuits and cross-coupling said second output of each of said translation circuits to said inputs of both of said translation circuits, and means deriving output signals from said outputs of a first one of said translation circuits.

4. The counter in accordance with claim 3 in which only direct current connections are employed for interconnecting all circuit elements thereof.

5. The counter in accordance with claim 3 in which said permutations are represented in Boolean form as $$Y_1 = Y_1\overline{TC} + Y_2\overline{T}C + Y_1TC + \overline{Y}_2T\overline{C}$$

$$Y_2 = Y_1\overline{TC} + Y_2\overline{T}C + \overline{Y}_1TC + Y_2T\overline{C}$$

where $Y_1$ and $Y_2$ are outputs of said first and second translation circuits, respectively, T represents said input signals, and C represents said control signals.

6. The counter in accordance with claim 3 in which said input signals, control signals, and signals at said outputs each have first and second signal conditions, first, second, and third ones of said gates are enabled by said first condition of said control signals to operate said counter in a first direction of counting mode in which said first gate drives both of said translation circuits in response to coincidence of said first condition from said first translation circuit second output and said second condition of said input signals, and said second and third gates are responsive to said first condition of said input signals for driving said first and second translation circuits, respectively, when said second translation circuit first output is in said first condition and said second translation circuit second output is in said first condition, respectively, and fourth, fifth and sixth ones of said gates are enabled by said second condition of said control signals to operate said counter in a second counting direction mode in which said fourth gate drives both of said translation circuits in response to coincidence of said first condition from said second translation circuit second output and said second condition of said input signals, and said fifth and sixth gates are responsive to said first condition of said input signals for driving said first and second translation circuits, respectively, when said first translation circuit first output is in said first condition and said first translation circuit second output is in said first condition, respectively.

7. The counter in accordance with claim 3 in which each of said coincidence gates comprises a common circuit junction, means coupling a potential source to said junction, first, second, and third diodes each having a first electrode connected to said common junction, and each having a second electrode, said second electrodes being connected to said receiving means, said control signal source, and an output of one of said translation circuits, respectively, and at least a fourth diode coupling said common junction to an input of one of said translation circuits.

8. The counter in accordance with claim 3 wherein each of said translation circuits comprises first and second transistors each including a collector electrode, said transistors being tandem-connected in common emitter amplifier circuits, means connecting said input of such translation circuit to a base electrode of said first transistor, means connecting said collector electrode of said first transistor to said first output of such translation circuit, and means connecting said collector electrode of said second transistor to said second output of such translation circuit.

9. The counter in accordance with claim 3 in which each of said translation circuits comprises two directly coupled tandem amplifier circuits biased for alternative conduction in response to two-level input signals at said input thereof, and such translation circuit input is coupled to an input of a first one of said amplifiers and said outputs of such translation circuit are derived at outputs of said two amplifier circuits, respectively.

10. The counter in accordance with claim 3 in which each of said coincidence gates comprises a semiconductor transistor device comprising a base connection, a collector connection, and at least first, second, and third emitter connections, a source of operating potential coupled to said base connection, means applying input signals from said receiving means to said first emitter connection, said coupling means applying said control signals to said second emitter connection, said cross-coupling means applying an output of one of said translation circuits to said third emitter connection, and means coupling said collector electrode to an input of one of said translation circuits.

11. The counter in accordance with claim 10 in which each of said semiconductor transistor devices includes a common substrate material of a first conductivity type, an epitaxial collector region of a second conductivity type, said collector region having collector contact portions thereof more heavily doped than the remainder of such region, a base region contiguous to said collector region between said collector contact portions, said base region being of said first conductivity type, and discrete emitter portions of said second conductivity type disposed in spaced portions of said base region, the spacing between said emitter electrode portions being greater than the minimum electric current path length from one of said emitter electrode portions to said collector region.

12. The counter in accordance with claim 10 wherein said semiconductor devices in two of said gates comprise in addition a fourth emitter connection to a translating circuit input to which said device collector connection of the other one of said two gates is connected, and each of said two gates has connected to the third emitter electrode of its semiconductor device said second output of the last-mentioned translating circuit.

13. The counter in accordance with claim 10 in which at least one of said semiconductor transistor devices comprises an additional emitter electrode for each output from such gate, and means connecting said base and collector electrodes together.

14. The counter in accordance with claim 3 in which each of said coincidence gates comprises a semi-conductor device including a first portion of predetermined conductivity type, a second portion contiguous to said first portion and of a different conductivity type, a plurality of additional portions of said predetermined conductivity type and formed contiguous to said second portion but each spaced from one another and from said first region to form with said second region a plurality of asymmetrical conducting devices, means applying said input signals, said control signals, and an output of one of said translation circuits to different ones of said additional portions, and means coupling said first region to an input of one of said translation circuits.

15. The counter in accordance with claim 3 in which said translation circuits and said coincidence gates interconnected as aforesaid comprise a single stage of said counter, said counter further comprises at least one additional counter stage of the same type as said single stage, all of said stages being connected in a tandem sequence for counting operation, a source of counting signals is coupled to said receiving means of a first stage in said sequence, and said coupling means apply said control signals to said gates of all of said stages.

16. The counter in accordance with claim 15 which comprises a source of setting signals, and means coupling said setting signals to each of said translation circuits for setting said counter to a predetermined state in response to said setting signals.

References Cited

UNITED STATES PATENTS

| | | | |
|---|---|---|---|
| 3,297,859 | 1/1967 | Reiser | 307—222 XR |
| 3,356,953 | 12/1967 | Petzold | 328—44 |

JOHN S. HEYMAN, Primary Examiner

STANLEY D. MILLER, Assistant Examiner

U.S. Cl. X.R.

307—213, 218, 225, 289; 328—44